United States Patent [19]

Bither, Jr.

[11] B 3,925,537

[45] Dec. 9, 1975

[54] METAL BORACITES

[75] Inventor: Tom Allen Bither, Jr., Wilmington, Del.

[73] Assignee: E. I. Du Pont de Nemours and Company, Wilmington, Del.

[22] Filed: Nov. 9, 1973

[21] Appl. No.: 414,288

[44] Published under the Trial Voluntary Protest Program on January 28, 1975 as document no. B 414,288.

Related U.S. Application Data

[63] Continuation-in-part of Ser. No. 181,605, Sept. 17, 1971, Pat. No. 3,801,703.

[52] U.S. Cl. .............................................. 423/277
[51] Int. Cl.² ........................ C01B 35/00; C01B 9/08
[58] Field of Search .................................... 423/277

[56] References Cited
UNITED STATES PATENTS 3,384,447   5/1968   Schmid .............................. 423/277

*Primary Examiner*—G. O. Peters

[57] ABSTRACT

Boracites of the formula $M_3B_7O_{13}F$ are described wherein M is at least one of Mg, Cr, Mn, Fe, Co, Zn, and Cd.

The compounds can be prepared by heating a boron source such as $B_2O_3$ with the fluorides or mixed fluorides and oxides of M at a pressure of 1–30 Kilobars and temperature of 400°–1,000°C. The crystals are rhombohedral (R3c extinctions) except chromium which has a cubic structure. The compositions are useful as the working elements in piezoelectric devices. The rhombohedral compounds are also ferroelectric.

8 Claims, No Drawings

METAL BORACITES

RELATED APPLICATION

This application is a continuation-in-part of application Ser. No. 181,605 filed Sept. 17, 1971 now U.S. Pat. No. 3,801,703.

FIELD OF THE INVENTION

This invention relates to novel compounds of boracite-type crystal structure and to their use in piezoelectric and pyroelectric devices.

PRIOR ART

Boracites are recognized as a distinct class of compounds based on the prototype mineral named boracite, $Mg_3B_7O_{13}Cl$. It is widely known that Mg can be replaced by the divalent ions Cr, Mn, Fe, Co, Ni, Cu, Zn, and Cd and Cl can be replaced by Br or I without a major change in the structure type or the characteristic properties of the compounds. Widespread interest in the boracites results from their useful electrical, magnetic and optical properties. These occur in several useful crystallographic modifications of the basic structure. For example, a cubic, high-temperature form is optically isotropic and piezoelectric; slightly distorted orthorhombic, and/or trigonal (rhombohedral), modifications exist at lower temperatures and are optically anisotropic and ferroelectric. The temperatures of transition between the various forms vary widely among the known boracite compounds.

Since the low-temperature forms of lower symmetry generally have the more useful properties, it is desirable to obtain boracite compositions whose low-temperature forms are stable at ambient conditions.

Boracite compounds, $M_3B_7O_{13}X$, wherein M is a variety of divalent cations and X is one of the halogens Cl, Br, and I, are disclosed in British Pat. No. 1,070,834 to Schmid. Despite intensive studies of the halogen series, no analogous compound with fluorine, $M_3B_7O_{13}F$, has been found.

SUMMARY OF THE INVENTION

The compositions of the present invention are novel boracites, $M_3B_7O_{13}F$, and wherein, M is at least one divalent ion of Mg, Cr, Mn, Fe, Co, Zn or Cd.

DETAILED DESCRIPTION OF THE INVENTION

The novel products of the invention expressly include compounds of formula $M_3B_7O_{13}F$, having the above stated limitations on M and having the characteristic boracite-type structure in crystal modifications which yield an X-ray diffraction powder pattern that can be indexed on the basis of a rhombohedral unit cell or in the case of Cr, a cubic unit cell. It is an object of the invention to obtain the boracites in well-defined crystals, preferably in the form of single crystals of sufficient size for the attachment of electrodes to opposing crystal faces.

The recognition of these new compositions as boracites is readily made by their stoichiometry, $M_3B_7O_{13}F$, determined by analysis and by their X-ray diffraction patterns. The latter bear a characteristic resemblance to that of the Mg-Cl species, the mineral boracite whose structure in both high- and low-temperature forms has been reported by Ito et al., Acta. Cryst. 4, 310 (1951). The high-temperature form of the mineral and that of all other boracites whose high-temperature structure has been described gives an X-ray powder pattern characteristic of the space group $F\bar{4}3c$. In their low-temperature forms the known boracites are described as having orthorhombic distortions (space group $Pca2_1$) or trigonal distortions (space group $R3c$) of the prototype cubic phase.

The products of this invention with the exception of Cr show X-ray diffraction patterns which can similarly be indexed by a rhombohedral (with R3c extinctions) unit cell, or in the case of Cr by a cubic unit cell.

Whereas the known boracites have been commonly prepared at essentially atmospheric pressure using flux fusion or vapor transport techniques, the products of this invention appear to require higher pressures for preparation. Pressures in the range from 1 to 30 kbars (1 kbar = $10^9$ dynes/cm² or about 1,000 atmospheres) are generally suitable. The lowest pressures can readily be attained in a strong metal vessel pressurized with an inert gas. At higher pressures, up to about 30 kbars, reactions can be carried out in a tetrahedral anvil device such as that described by Lloyd et al., J. Res. Nat. Bur. Stand. 63C, 59 (1959) or in a piston-cylinder device such as that described by Boyd and England, J. Geophys. Res. 65, 741-8 (1960).

Reaction temperatures in the range 400°–1,000°C are generally suitable for times ranging from a few hours at the highest temperature to 24 hours or more at the lower temperatures. Platinum or gold vessels are suitable for containing the reactants under the high pressure, high temperature conditions. It is generally convenient to press the reactant mixture into pellets which can then be sealed into a short length of thin-walled (0.005–0.015 inch) platinum or gold tubing. After an appropriate time at the desired reaction temperature and pressure, the products may be cooled slowly, or rapidly quenched, to room temperature. It is desirable to delay quenching until the boracite product is fully solidified. To facilitate the growth of large crystals, the reactant mixture may be heated in a thermal gradient, or one or more of the reactants may be supplied gradually by mass transport from a separate, pressurized region. The boracite products may be recovered from the mixture after extraction with hot water to remove unreacted materials and soluble impurities.

The F-boracites, $M_3B_7O_{13}F$, can be prepared from either anhydrous or hydrated divalent metal fluorides, $MF_2$ and $MF_2.xH_2O$, or from mixtures of divalent metal oxides and fluorides and a boron source, such as $B_2O_3$. Combinations of higher-valent metal oxides and fluorides mixed with sufficient oxidizable metal calculated to produce divalent cations can also be used in place of the divalent metal fluoride.

Fluoride ion must be present in sufficient quantity to insure its full occupation of the unique anion site in the boracite structure. Thus, the F/B atom ratio in the starting mixture should exceed the 1/7 ratio stoichometrically required for $M_3B_7O_{13}F$ and preferably should be in the range from 1/3 to 1/1. If the fluoride content of the starting mixture is less than that required to give a 1/7 atom ratio for F/B, e.g., in the range 1/10 to 1/20, and if the starting materials contain a source of OH ions such as from $H_3BO_3$ or hydrated metal oxides or hydroxides, then a portion of the unique fluoride ion sites may be occupied by OH ions.

Either $B_2O_3$ or $H_3BO_3$ may be used as a source of boron, and even BN may be used if water is present in the system. The M/B atom ratio in the starting materials may range from 1/6 to 1/1. Ratios poorer in metal than the stoichiometric 3/7 are generally preferred so that excess reactants are easily removed by hot water extraction.

As normally prepared at pressures up to about 30 kbars, the F-boracites of Mg, Mn, Fe, Co, Zn, and Cd give X-ray diffraction patterns which can be indexed on the basis of a rhombohedral unit cell and have extinctions characteristic of R3c symmetry. Since this is the same structure as some of the known boracites in their low-temperature modification, these new F-boracites may also be thought of as trigonal distortions of a cubic prototype characteristic at higher temperatures. They show, however, a higher degree of distortion from the cubic prototype than do the known rhombohedral Fe-Cl-, Fe-Br-, and Zn-Cl-boracites (as measured, e.g., by the departure from 90° of the angle of a pseudocubic rhombohedral cell). In addition, these F-boracites show no thermal transitions (by differential scanning calorimetry up to about 600°C) that would indicate a first order transition to the cubic, high-temperature form. Broad but shallow endotherms sometimes noted at temperatures around 180°C appear to have no effect on structure. These results suggest that the more useful distorted structure of these F-boracites may persist up to the point of decomposition at temperatures of about 800°–900°C.

In contrast to these, the new Cr-F-boracite persists in a cubic modification even at room temperature. As with the Cl-, Br-, and I-boracites of Cr known to the art, the F-boracite of Cr apparently has a transformation temperature well below those of other divalent metals.

UTILITY

Like the boracites well known to the art, the new compounds of this invention have the capacity of producing valuable electrical and optical switching effects which derive from their special structures. All of the boracites have structures which are non-centrosymmetric and thus are capable of piezoelectric effects. In their low-temperature forms, the boracite crystals are believed to be comprised of domains characterized by distinct polarization and strain vectors which may give rise to non-linear interactions with an applied electrical field, a mechanical strain or a thermal gradient.

Because of their relatively large distortions from cubic symmetry, the new boracites of this invention provide an opportunity for larger ferroelectric polarization and ferroelastic strain than occurs in the halogenoboracites previously known to the art.

As an example, opposing faces of a boracite single crystal may be electroded by conventional techniques of vapor deposition of a conductive metal or by painting with a commercially available silver paste, to which connecting leads may be attached. If the crystal is then appropriately clamped to prevent extraneous movements, the application of an a.c. voltage can be used to generate sonic waves by periodic vibration induced in the direction of the electrical gradient.

A pyroelectric device can be made by focusing a pulsed heat input, e.g., from a laser source, onto one such electroded face. An electrical output across the electrodes can then be measured as pulses of voltage or current using the appropriate electrical detector.

Further embodiments of the invention will be obvious from the illustrative examples given below.

EXAMPLE 1

A mixture of 1.690 g of $CoF_2 \cdot 4H_2O$ (10 mmoles) and 1.393 g of $B_2O_3$ (20 mmoles) was sealed into a ⅜ inch I.D. gold tube about 5 inches in length. This tube was maintained for 24 hours at a temperature of 700°C under an external argon pressure of approximately 3 kbars and was then rapidly cooled to room temperature. The resultant solids were extracted with hot water to remove soluble impurities. Approximately 1.4 g of deep red-purple crystals of cubic growth habit (0.1 mm across) were obtained as the main product of this reaction. A few grayish tetrahedral crystals of larger size were mechanically separated from the main phase for a final cleanup prior to characterization.

An X-ray diffraction powder pattern was obtained upon these red-purple crystals with a Hägg-Guinier camera using monochromatic Cu radiation and a KCl internal standard ($a$=6.2931 A). This powder pattern (Table 1) was observed to relate to that of the mineral boracite, $Mg_3B_7O_{13}Cl$, but some line splitting was noted, indicating either the same low-temperature form of the orthorhombic boracite-type structure as in $Mg_3B_7O_{13}Cl$ (space group $Pca2_1$ pertains) but with a higher degree of distortion from the high-temperature cubic form or a distorted structure related to that of boracite but having different symmetry. The powder pattern could be indexed on the basis of a rhombohedral unit cell using space group R3c extinctions and the hexagonal indices $a$=8.498, $c$=21.055A (volume$_{hex}$ = 1317A$^3$).

TABLE 1

X-Ray Diffraction Powder Pattern of Rhombohedral $Co_3B_7O_{13}F$

| Intensity* | h | k | l | d Spacing, A |
|---|---|---|---|---|
| 50 | 0 | 1 | 2 | 6.0261 |
| 75 | 1 | 0 | 4 | 4.2799 |
| 25 | 1 | 1 | 0 | 4.2467 |
| 80 | 0 | 0 | 6 | 3.5086 |
| 70 | 2 | 0 | 2 | 3.4727 |
| 100 | 0 | 2 | 4 | 3.0155 |
| 20 | 1 | 1 | 6 | 2.7051 |
| 60 | 1 | 2 | 2 | 2.6891 |
| 15 | 0 | 1 | 8 | 2.4782 |
| 60 | (3 | 0 | 0) | 2.4533 |
|  | (2 | 1 | 4) |  |
| 40 | 2 | 0 | 8 | 2.1407 |
| 40 | 2 | 2 | 0 | 2.1243 |
| 30 | 1 | 1 | 9 | 2.0495 |
| 35 | 2 | 1 | 7 | 2.0422 |
| 50 | (2 | 2 | 3) | 2.0327 |
|  | (1 | 3 | 1) |  |
| 20 | 1 | 0 | 10 | 2.0248 |
| 40 | 3 | 0 | 6 | 2.0107 |
| 15 | 3 | 1 | 2 | 2.0038 |
| 20 | 1 | 2 | 8 | 1.9117 |
| 2 | 1 | 3 | 4 | 1.9030 |
| 50 | 0 | 2 | 10 | 1.8278 |
| 20 | 0 | 4 | 2 | 1.8129 |
| 10 | 0 | 0 | 12 | 1.7553 |
| 35 | 4 | 0 | 4 | 1.7369 |
| 10 | 2 | 1 | 10 | 1.6787 |
| 40 | 2 | 3 | 2 | 1.6674 |
| 35 | (3 | 2 | 4) | 1.6078 |
|  | (4 | 1 | 0) |  |
| 10 | 1 | 0 | 13 | 1.5811 |
| 15 | 4 | 1 | 6 | 1.4603 |
| 15 | 5 | 0 | 2 | 1.4579 |
| 20 | 3 | 0 | 12 | 1.4273 |
| 20 | 2 | 3 | 8 | 1.4214 |
| 15 | (0 | 5 | 4) | 1.4179 |
|  | (3 | 3 | 0) |  |
| 10 | 2 | 2 | 12 | 1.3526 |
| 10 | 2 | 4 | 4 | 1.3444 |

*An intensity value of 100 is assigned to the strongest line of the pattern.

Analyses on this boracite-type phase indicated the composition $Co_3B_7O_{13}F$; Calcd.; Co, 36.87; B, 15.78;

F, 3.96 percent. Found: Co, 36.94, 37.08; B, 15.99; F, 4.06 percent. Further confirmation that this compound has the boracite structure was obtained from its infrared spectrum which indicated the presence of trigonally and tetrahedrally coordinated boron, both of which are present in the boron-oxygen network of the boracite structure.

By differential scanning calorimetry, a very broad endotherm with a minimum near 200°C was observed while heating this compound. No change in the X-ray diffraction pattern at room temperature was noted after two heating cycles to 475°C. Decomposition occurred upon heating to 882°C.

A 0.163-g pellet made from a mixture of 1.013 g of $CoF_2 \cdot 4H_2O$ (6 mmoles) and 0.836 g of $B_2O_3$ (12 mmoles) and contained in a gold capsule was pressured to 25 Kilobars in a tetrahedral anvil device, heated for 2 hours at 1,000°C, slow cooled 4 hours to 400°C and quenched to room temperature. Following extraction with hot water, deep red polyhedral crystals up to 2 mm in cross-section were isolated from this reaction product. These crystals had an X-ray diffraction powder pattern the same as that of the boracite-type phase described previously in this example (Table I), indicating formation of the compound $Co_3B_7O_{13}F$. Oxygen analysis confirmed this composition; calcd: O, 43.38 percent; Found: O, 43.68, 43.51 percent. Thermal stability measurements duplicated those preceding in this example and a positive test for piezoelectricity was obtained upon these $Co_3B_7O_{13}F$ crystals.

A 0.579-g pellet made from a mixture of 2.280 g of $CoF_2 \cdot 4H_2O$ (13.5 mmoles) and 1.410 g of $B_2O_3$ (20.2 mmoles) and contained in a welded gold capsule was pressured to 30 kbars in a piston-cylinder device, heated for 2 hours at 1,000°C, slow-cooled for 4 hours to 400°C, and quenched to room temperature. Following extraction of this reaction product with hot water, deep-red crystals of cubic habit up to 2 mm in size of the $Co_3B_7O_{13}F$ boracite-type compound described previously in this example were isolated as single phase material.

EXAMPLE 2

A 0.608-g pellet made from a mixture of 1.689 g of $FeF_2$ (18 mmoles) and 1.880 g of $B_2O_3$ (27 mmoles) and contained in a welded platinum capsule was pressured to 10 kbars in a piston-cylinder device, heated for 2 hours at 1,000°C, slow-cooled for 4 hours to 400°C, and quenched to room temperature. Following hot water extraction of the product, irregularly shaped, clear yellow-green crystals having a crazed appearance and of size up to 1 mm were isolated. The X-ray diffraction powder pattern of this material (Table II) was isotypic with that of the boracite-type compound $Co_3B_7O_{13}F$ of Example 1 and could be indexed on the basis of a rhombohedral unit cell using space group R3c extinctions and the hexagonal indices $a = 8.562$, $c = 21.168\text{Å}$ ($Vol_{hex} = 1344\text{Å}^3$).

Fluorine analysis confirmed the composition $Fe_3B_7O_{13}F$. Calcd.: F, 4.04 percent; Found: F, 4.31 percent. No change in the X-ray diffraction pattern at room temperature was noted in this iron fluoroboracite following heating to 475°C and subsequent cooling.

A second sample of $Fe_3B_7O_{13}F$ (Calcd.: O, 44.23 percent; Found: O, 44.46 percent) was prepared in the manner above except that a heating time of 2 hours at 800°C was used. By differential scanning calorimetry, a very broad endotherm with a minimum near 160°C was observed while heating this compound. As above, no change in the X-ray diffraction pattern at room temperature (Table II) was noted in this iron fluoroboracite following heating to 450°C.

TABLE II

X-Ray Diffraction Powder Pattern of Rhombohedral $Fe_3B_7O_{13}F$

| Intensity* | h | k | l | d Spacing, Å |
|---|---|---|---|---|
| 50 | 0 | 1 | 2 | 6.0629 |
| 75 | 1 | 0 | 4 | 4.3029 |
| 20 | 1 | 1 | 0 | 4.2766 |
| 90 | 0 | 0 | 6 | 3.5257 |
| 60 | 2 | 0 | 2 | 3.4975 |
| 100 | 0 | 2 | 4 | 3.0353 |
| 25 | 1 | 1 | 6 | 2.7216 |
| 60 | 1 | 2 | 2 | 2.7082 |
| 20 | 0 | 1 | 8 | 2.4909 |
| 75 | {3<br>{2 | 0<br>1 | 0}<br>4} | 2.4713 |
| 55 | 2 | 0 | 8 | 2.1541 |
| 55 | 2 | 2 | 0 | 2.1409 |
| 40 | 1 | 1 | 9 | 2.0613 |
| 50 | 2 | 1 | 7 | 2.0556 |
| 60 | {2<br>{1 | 2<br>3 | 3}<br>1} | 2.0481 |
| 20 | 1 | 0 | 10 | 2.0356 |
| 50 | 3 | 0 | 6 | 2.0244 |
| 20 | 3 | 1 | 2 | 2.0188 |
| 25 | 1 | 2 | 8 | 1.9241 |
| 60 | 0 | 2 | 10 | 1.8386 |
| 60 | 2 | 2 | 6 | 1.8304 |
| 30 | 0 | 4 | 2 | 1.8261 |
| 15 | 0 | 0 | 12 | 1.7645 |
| 40 | 4 | 0 | 4 | 1.7499 |
| 20 | 2 | 1 | 10 | 1.6895 |
| 45 | 2 | 3 | 2 | 1.6798 |
| 50 | {3<br>{4 | 2<br>1 | 4}<br>0} | 1.6193 |
| 20 | {5<br>{4 | 0<br>1 | 2}<br>6} | 1.4696 |
| 30 | 3 | 0 | 12 | 1.4358 |
| 35 | 2 | 3 | 8 | 1.4309 |
| 30 | {0<br>{3 | 5<br>3 | 4}<br>0} | 1.4280 |
| 20 | {5<br>{2<br>{3<br>{2 | 0<br>0<br>3<br>4 | 5}<br>14}<br>3}<br>1} | 1.3998 |
| 5 | 4 | 0 | 10 | 1.3948 |
| 20 | 2 | 2 | 12 | 1.3611 |
| 10 | 2 | 4 | 4 | 1.3547 |
| 20 | {1<br>{4<br>{0<br>{5 | 2<br>2<br>5<br>1 | 14}<br>5}<br>7}<br>1} | 1.3305 |
| 20 | 3 | 2 | 10 | 1.3259 |
| 10 | {3<br>{1 | 3<br>5 | 6}<br>2} | 1.3227 |
| 20 | 5 | 0 | 8 | 1.2935 |

* An intensity of 100 is assigned to the strongest line of the pattern.

A 0.209-g pellet made from a mixture of 0.469 g of $FeF_2$ (5 mmoles), 0.359 g of FeO (5 mmoles), and 0.557 g of $B_2O_3$ (8 mmoles) was heated in the manner of Example 1 at a pressure of 25 kbars. Pale blue-green crystals of $Fe_3B_7O_{13}F$ (Calcd.: O, 44.23 percent; Found: O, 44.58 percent) having the X-ray diffraction pattern of Table II were obtained following hot water extraction. Crushed fragments of this fluoroboracite were observed to be anisotropic under the optical microscope and a uniaxial symmetry figure was observed, in confirmation of the rhombohedral indexing used for the X-ray powder pattern.

EXAMPLE 3

A mixture of 1.115 g of $MnF_2$ (12 mmoles), 0.836 g of $B_2O_3$ (12 mmoles), and 1.484 g of $H_3BO_3$ (24 mmoles) was sealed into a ⅜ inch I.D. gold tube about 5 inches in length. This tube was maintained for 4 hours at a temperature of 700°C, slow-cooled at approximately 25°C per hour to 200°C, and then rapidly led to room temperature, all under an external
on pressure of approximately 3 kbars. The resultant
ls were extracted with water to remove soluble
urities. Approximately 1.0 g of light pink micro-
tals were obtained. The X-ray diffraction powder
ern of this material was isotypic with that of the
icite-type compound $Co_3B_7O_{13}F$ of Example I and
ld be indexed on the basis of a rhombohedral unit
using space group R3c extinctions and the hexago-
indices $a = 8.620, c = 21.342A$ ($Vol_{hex} = 1373A^3$).
nalyses on this boracite-type phase indicated the
position $Mn_3B_7O_{13}F$. Calcd.: Mn, 35.26; F, 4.06
:ent; Found: Mn, 35.31percent; F, 3.93percent. By
:rential scanning calorimetry, a very broad endo-
m with a minimum near 180°C was observed on
:ing this compound. No change in the X-ray pattern
oom temperature was noted after heating this com-
nd to 550°C.

EXAMPLE 4 mixture of 1.170 g of $CrF_2$ (13 mmoles) and 1.811
$B_2O_3$ (26 mmoles) was reacted in a ⅜ inch I.D.
ed gold tube at 3 kbars pressure in the manner of
mple 1. Following hot water extraction, an intimate
ture of small pale blue and small deep green crystals
isolated from the resultant product. A Debye-
errer X-ray diffraction powder pattern showed the
wn borate $CrBO_3$ (green crystals) to be one of the
phases present. Following deletion of the diffrac-
lines corresponding to $CrBO_3$, the remainder of the
iy pattern (Table III) could be indexed on the basis
face-centered cubic cell of dimension $a = 12.131A$
related to that of the mineral boracite,
$B_7O_{13}Cl$. Although the blue boracite-type crystals
ld not be isolated as a single phase for analysis, the
ture of blue plus green ($CrBO_3$) crystals contained
e 3 percent fluorine, indicating the presence of
rine in the boracite-type phase, i.e., $Cr_3B_7O_{13}F$
lcd. for F, 4.14percent).

TABLE III

X-Ray Diffraction Powder Pattern of $Cr_3B_7O_{13}F$

| Intensity* | h | k | l | d Spacing, A |
|---|---|---|---|---|
| 20 | 2 | 2 | 0 | 4.2837 |
| 50 | 2 | 2 | 2 | 3.4944 |
| 100 | 4 | 0 | 0 | 3.0269 |
| 70 | 4 | 2 | 0 | 2.7075 |
| 10 | 4 | 2 | 2 | 2.4744 |
| 80 | 4 | 4 | 0 | 2.1414 |
| 75 | 5 | 3 | 1 | 2.0479 |
| 10 | 6 | 0 | 0 | 2.0219 |
| 60 | 6 | 2 | 2 | 1.8270 |
| 50 | 4 | 4 | 4 | 1.7493 |
| 20 | 6 | 4 | 0 | 1.6814 |
| 10 | 7 | 3 | 1 | 1.5791 |
| 20 | 8 | 0 | 0 | 1.5161 |
| 25 | 8 | 2 | 0 | 1.4702 |
| 5 | 6 | 6 | 0 | 1.4303 |
| 20 | 6 | 6 | 2 | 1.3908 |
| 40 | 8 | 4 | 0 | 1.3560 |
| 2 | 8 | 4 | 2 | 1.3240 |
| 2 | 6 | 6 | 4 | 1.2926 |
| 2 | 9 | 3 | 1 | 1.2713 |
| 40 | 8 | 4 | 4 | 1.2369 |
| 2 | 10 | 2 | 2 | 1.1675 |
| 2 | 10 | 4 | 0 | 1.1264 |
| 10 | 8 | 8 | 0 | 1.0720 |
| 5 | 8 | 8 | 2 | 1.0556 |
| 10 | 10 | 6 | 2 | 1.0249 |
| 25 | 12 | 0 | 0 | 1.0105 |
| 20 | 12 | 4 | 0 | 0.9588 |
| 10 | 10 | 8 | 0 | 0.9477 |
| 2 | 10 | 6 | 6 | 0.9247 |
| 15 | 12 | 4 | 4 | 0.9143 |
| 15 | 12 | 6 | 0 | 0.9040 |
| 10 | 14 | 2 | 2 | 0.8493 |
| 10 | 12 | 8 | 0 | 0.8411 |

TABLE III-continued

X-Ray Diffraction Powder Pattern of $Cr_3B_7O_{13}F$

| Intensity* | h | k | l | d Spacing, A |
|---|---|---|---|---|
| 5 | 14 | 4 | 0 | 0.8333 |
| 2 | 13 | 7 | 1 | 0.8195 |
| 30 | 12 | 8 | 4 | 0.8106 |
| 15 | 14 | 6 | 2 | 0.7867 |

*An intensity value of 100 is assigned to the strongest line of the pattern.

EXAMPLE 5

A mixture of 1.754 g of $ZnF_2.4H_2O$ (10 mmoles) and
1.393 g of $B_2O_3$ (20 mmoles) was reacted in a ⅜ inch
I.D. sealed gold tube at a pressure of 3 kbars and a
temperature of 500°C in the manner of Example 1. A
white, microcrystalline powder was isolated from this
reaction following extraction with hot water. The X-ray
diffraction powder pattern of this material was isotypic
with that of the boracite-type compound $Co_3B_7O_{13}F$ of
Example 1 and could be indexed on the basis of a
rhombohedral unit cell using space group R3c extinc-
tions and the hexagonal indices $a = 8.498, c = 21.162A$
($Vol_{hex} = 1323A^3$). Analyses confirmed the composi-
tion $Zn_3B_7O_{13}F$. Calcd.: F, 3.81 percent; Zn, 39.32
percent; Found: F, 3.78, 3.98 percent; Zn, 38.03 per-
cent. By differential scanning calorimetry, a very broad
endotherm with a minimum near 180°C was observed
while heating this compound.

This zinc fluoroboracite could also be prepared as
above at a temperature of 400°C but $Zn_3B_7O_{13}F$ was
present only at low concentration in the reaction prod-
uct prepared at a temperature of 600°C.

By use of $CdF_2$ in place of $ZnF_2.4H_2O$ in the above
reactions, the Cd isotype $Cd_3B_7O_{13}F$, mixed with impu-
rities, was obtained as a white powder. Relevant lines in
the powder patterns could be indexed in the manner of
that for $Co_3B_7O_{13}F$ (Table I) on the basis of a rhombo-
hedral unit cell using the hexagonal indices $a = 8.60, c
= 21.33A$ ($Vol_{hex} = 1368A^3$).

EXAMPLE 6

A 0.147-g pellet made from a mixture of 0.084 g of
$MgF_2$ (1.35 mmoles), 0.272 g of MgO (6.75 mmoles),
and 1.670 g of $H_3BO_3$ (27 mmoles) and contained in a
gold capsule was pressured to 25 kbars in a tetrahedral
anvil device, heated for 8 hours at 600°C, and then
quenched to room temperature. Following extraction
with hot water, opaque, colorless polyhedral crystals
were isolated. The X-ray diffraction powder pattern of
this material, which was isotypic with that of the bora-
cite-type compound $Co_3B_7O_{13}F$ of Example 1 and
could be indexed on the basis of a rhombohedral unit
cell using space group R3c extinctions and the hexago-
nal indices $a = 8.480, c = 21.086A$ ($Vol_{hex} = 1313A^3$),
indicated formation of the boracite $Mg_3B_7O_{13}F$. By
differential scanning calorimetry, a very broad endo-
therm with a minimum near 170°C was observed while
heating this compound.

Since obvious modifications and equivalents in the
invention will be evident to those skilled in the chemi-
cal arts, I propose to be bound solely by the appended
claims.

I claim:
1. Metal boracites of the formula

$$M_3B_7O_{13}F$$

wherein M is at least one divalent ion of Mg, Cr, Mn, Fe, Co, Zn or Cd.

2. Composition of claim 1 where M is Mg.
3. Composition of claim 1 where M is Cr.
4. Composition of claim 1 where M is Mn.
5. Composition of claim 1 where M is Fe.
6. Composition of claim 1 where M is Co.
7. Composition of claim 1 where M is Zn.
8. Composition of claim 1 where M is Cd.

* * * * *

UNITED STATES PATENT OFFICE
CERTIFICATE OF CORRECTION

Patent No. 3,925,537      Dated December 9, 1975

Inventor(s) Tom Allen Bither, Jr.      Page 1 of 2

It is certified that error appears in the above-identified patent and that said Letters Patent are hereby corrected as shown below:

Column 7 should appear as shown on attached sheet.

Signed and Sealed this

Twenty-ninth Day of March 1977

[SEAL]

Attest:

RUTH C. MASON
*Attesting Officer*

C. MARSHALL DANN
*Commissioner of Patents and Trademarks* cooled to room temperature, all under an external argon pressure of approximately 3 kbars. The resultant solids were extracted with water to remove soluble impurities. Approximately 1.0 g of light pink microcrystals were obtained. The X-ray diffraction powder pattern of this material was isotypic with that of the boracite-type compound $Co_3B_7O_{13}F$ of Example I and could be indexed on the basis of a rhombohedral unit cell using space group R3c extinctions and the hexagonal indices $a = 8.620$, $c = 21.342A$ ($Vol_{hex} = 1373A^3$).

Analyses on this boracite-type phase indicated the composition $Mn_3B_7O_{13}F$. Calcd.: Mn, 35.26; F, 4.06 percent; Found: Mn, 35.31percent; F, 3.93percent. By differential scanning calorimetry, a very broad endotherm with a minimum near 180°C was observed on heating this compound. No change in the X-ray pattern at room temperature was noted after heating this compound to 550°C.

EXAMPLE 4

A mixture of 1.170 g of $CrF_2$ (13 mmoles) and 1.811 g of $B_2O_3$ (26 mmoles) was reacted in a ⅜ inch I.D. sealed gold tube at 3 kbars pressure in the manner of Example 1. Following hot water extraction, an intimate mixture of small pale blue and small deep green crystals was isolated from the resultant product. A Debye-Scherrer X-ray diffraction powder pattern showed the known borate $CrBO_3$ (green crystals) to be one of the two phases present. Following deletion of the diffraction lines corresponding to $CrBO_3$, the remainder of the X-ray pattern (Table III) could be indexed on the basis of a face-centered cubic cell of dimension $a = 12.131A$ that related to that of the mineral boracite, $Mg_3B_7O_{13}Cl$. Although the blue boracite-type crystals could not be isolated as a single phase for analysis, the mixture of blue plus green ($CrBO_3$) crystals contained some 3 percent fluorine, indicating the presence of fluorine in the boracite-type phase, i.e., $Cr_3B_7O_{13}F$ (Calcd. for F, 4.14percent).

TABLE III

| X-Ray Diffraction Powder Pattern of $Cr_3B_7O_{13}F$ | | | | |
|---|---|---|---|---|
| Intensity* | h | k | l | d Spacing, A |
| 20 | 2 | 2 | 0 | 4.2837 |
| 50 | 2 | 2 | 2 | 3.4944 |
| 100 | 4 | 0 | 0 | 3.0269 |
| 70 | 4 | 2 | 0 | 2.7075 |
| 10 | 4 | 2 | 2 | 2.4744 |
| 80 | 4 | 4 | 0 | 2.1414 |
| 75 | 5 | 3 | 1 | 2.0479 |
| 10 | 6 | 0 | 0 | 2.0219 |
| 60 | 6 | 2 | 2 | 1.8270 |
| 50 | 4 | 4 | 4 | 1.7493 |
| 20 | 6 | 4 | 0 | 1.6814 |
| 10 | 7 | 3 | 1 | 1.5791 |
| 20 | 8 | 0 | 0 | 1.5161 |
| 25 | 8 | 2 | 0 | 1.4702 |
| 5 | 6 | 6 | 0 | 1.4303 |
| 20 | 6 | 6 | 2 | 1.3908 |
| 40 | 8 | 4 | 0 | 1.3560 |
| 2 | 8 | 4 | 2 | 1.3240 |
| 2 | 6 | 6 | 4 | 1.2926 |
| 2 | 9 | 3 | 1 | 1.2713 |
| 40 | 8 | 4 | 4 | 1.2369 |
| 2 | 10 | 2 | 2 | 1.1675 |
| 2 | 10 | 4 | 0 | 1.1264 |
| 10 | 8 | 8 | 0 | 1.0720 |
| 5 | 8 | 8 | 2 | 1.0556 |
| 10 | 10 | 6 | 2 | 1.0249 |
| 25 | 12 | 0 | 0 | 1.0105 |
| 20 | 12 | 4 | 0 | 0.9588 |
| 10 | 10 | 8 | 0 | 0.9477 |
| 2 | 10 | 6 | 6 | 0.9247 |
| 15 | 12 | 4 | 4 | 0.9143 |
| 15 | 12 | 6 | 0 | 0.9040 |
| 10 | 14 | 2 | 2 | 0.8493 |
| 10 | 12 | 8 | 0 | 0.8411 |